Oct. 16, 1956 R. H. KINGDON 2,767,353
PANELBOARD

Filed Sept. 26, 1952 2 Sheets-Sheet 1

INVENTOR.
Ralph H. Kingdon.
BY
Myron J. Seibold
ATTORNEY.

Oct. 16, 1956 R. H. KINGDON 2,767,353
PANELBOARD
Filed Sept. 26, 1952 2 Sheets-Sheet 2
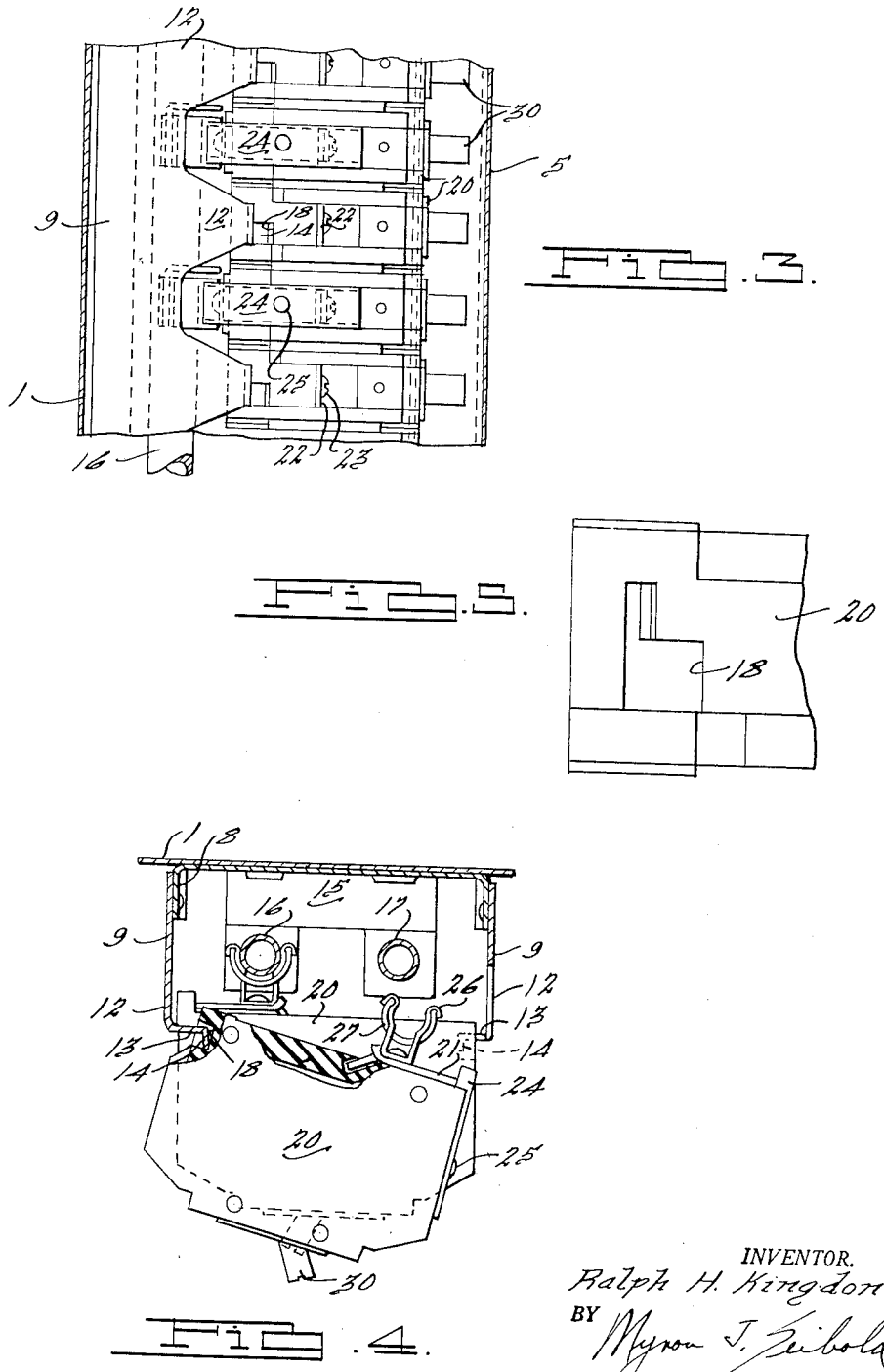
INVENTOR.
Ralph H. Kingdon
BY Myron J. Seibold
ATTORNEY

United States Patent Office 2,767,353
Patented Oct. 16, 1956

2,767,353

PANELBOARD

Ralph H. Kingdon, Birmingham, Mich., assignor to Square D Company, Detroit, Mich., a corporation of Michigan Application September 26, 1952, Serial No. 311,677

6 Claims. (Cl. 317—119)

This invention relates to an electrical panelboard, and has for one of its objects the provision of a panelboard in which individual circuit controlling units are provided therein, these units being mounted within the panelboard by connection at one point to a bus conductor and at another point to a fixed part of the panelboard enclosure.

A further object of the present invention is the provision of a panelboard construction in which a circuit controlling element is mechanically and electrically mounted by interlocking at one point with the panelboard interior and connecting to a bus conductor at another point by means of a simple clip.

Another object of the present invention is the provision of a panelboard having a plurality of bus conductors and a plurality of circuit controlling units, the panelboard being so constructed that substantially equal numbers of circuit controlling units are electrically connected to each bus conductor.

Another object is the construction of a panelboard in accordance with the preceding object in which immediately adjacent circuit controlling units are electrically connected to different bus conductors.

Another object is the provision of a panelboard in accordance with the preceding object in which a plurality of circuit controlling units are provided, each of these units having a handle movable to "on" and "off" positions, the circuit controlling units being no mounted within the panelboard that all of the "on" positions of these units are aligned, as are all of the "off" positions, whereby movement of the handles of these circuit controlling units in one direction closes the circuits through these units, while movement of the handles in the opposite direction opens the circuits through these units.

Another object of the present invention is the provision of a panelboard in which a plurality of circuit controlling units having terminals for connection to electric loads are provided, the circuit controlling units being so mounted that substantial space is provided adjacent to both sides of all "load" terminals whereby the wiring thereof is facilitated, the overall dimensions of the panelboard, however, being minimized.

Another object is the provision of a panelboard in accordance with the preceding object in which immediately adjacent circuit controlling units have their "load" terminals facing opposite sides of the panelboard.

Other objects and features of the invention will be readily apparent to those skilled in the art from the specification and appended drawing illustrating certain preferred embodiments in which:

Figure 3 is a view along the line III—III of Figure 1.

Figure 4 is a detail view similar to Figure 2 showing a circuit controlling unit of the panelboard in a mounting or demounting position with certain parts broken away.

Figure 5 is an enlarged end view of the mounting portion of the circuit controlling units.

Figure 1:
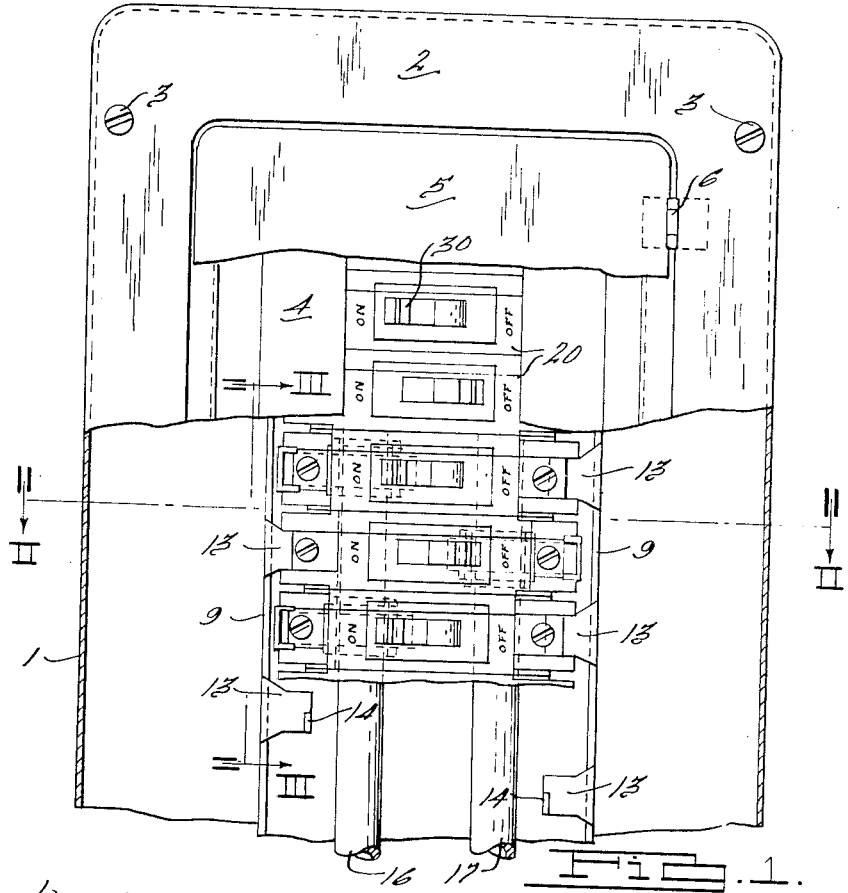
Figure 1 is a front elevational view of the panelboard in accordance with the present invention with part of the cover broken away to show internal parts.

The panelboard of the present invention comprises a sheet metal box 1 having a trim cover 2 normally attached to the box 1 by means of screws 3 which thread into flanges at the edges of the box 1. Secured to the cover 2 by suitable means, such as welding, is an inwardly extending trim plate 4 having its central portion cut out. A cover 5 is secured to the cover 2 by hinges 6, the cover 5 being provided with a handle and latch 7 which cooperates with a catch on plate 4 to secure the cover 5 over the cutout portion in the plate 4.

Secured to the base of the box 1 by suitable means (not shown) is a channel 8 having turned up edges to each of which a side bracket 9 is fixed, as by rivets 11. The brackets 9 are constructed with forwardly extending fingers 12 having inturned end portions 13 provided with outturned tips 14. As may be seen in Figure 1, the fingers 12 are so constructed that the tips 14 thereof are similarly positioned within the panelboard; that is, the tips 14 in the position of Figure 1 are all at the lower edges of their respective end portions 13 at both sides of the channel 8. As further illustrated in Figure 1, the two brackets 9 are so constructed as to place their respective fingers 12 in a longitudinally spaced relationship on opposite sides of the panelboard, such that immediately adjacent circuit controlling elements must cooperate with opposite brackets in the manner described.

Also mounted upon the channel 8 near opposite ends thereof are insulating blocks 15 which carry tubular bus conductors 16 and 17.

Circuit controlling units 20 incorporated in the panelboard of the present invention may be circuit breakers, and may have any of a variety of internal constructions; therefore, the internal elements of the circuit controlling units will not be discussed herein. The internal mechanism of the particular circuit breaker shown herein is more fully disclosed in the copending application of John G. Jackson for Circuit Breaker, Serial No. 262,918, filed December 22, 1951, and reference is made thereto for a detailed explanation of the internal construction and operation of this circuit breaker.

Each of the circuit controlling units 20 utilized in the panelboard of the present invention has a handle 30 movable to opposite positions for closing and opening the circuit through the breaker, these positions being marked "on" and "off" respectively. Each unit 20 has L-shaped slots 18 in the opposite end walls of the base thereof as shown in Figure 5, the slots in both ends of the circuit controlling units being formed in the same direction so that the enlarged bases of the Ls are adjacent the same side of the unit. These slots 18 are constructed so as to interlock with the outturned tips 14 and inturned end portions 13 of the brackets 9. A pair of slots 19 are provided in the bottom wall of the base of each circuit controlling unit to form additional mounting surfaces, as explained below.

Figure 2:
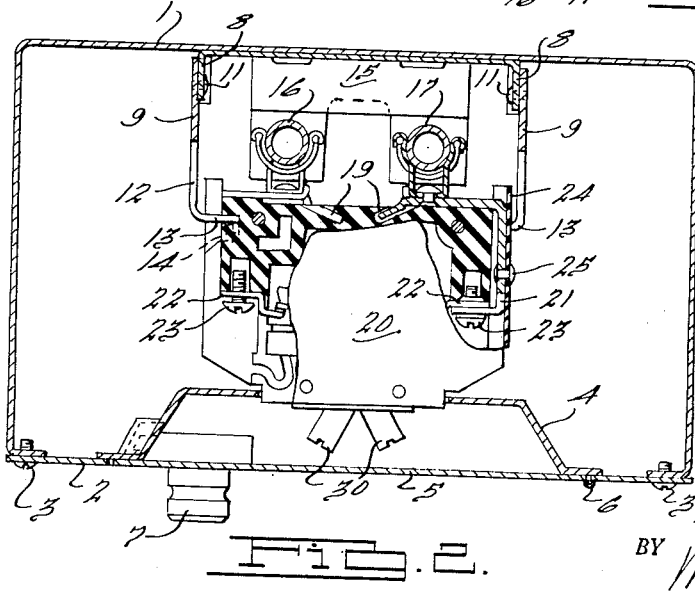
Figure 2 is a view of the panelboard taken along the lines II—II of Figure 1, certain portions of the side plate of the controlling unit being removed.

Prior to its insertion into the panelboard, each of the units 20 has mounted to one end thereof a conducting strip 21. Each of the units 20 has a terminal 22 at each end thereof, and one end of strip 21 is fixed to one of these terminals 22 by means of a terminal screw 23, one of which is provided in each terminal 22. The opposite end of strip 21 is inserted in one of the slots 19 prior to the terminal connection, and near this opposite end a spring clip 26 is electrically and mechanically mounted on the strip 21. Spring clip 26 is provided with a reinforcing spring 27 of conventional type. An insulating shield 24 is secured to the exterior of conducting strip 21 by means of a rivet 25. It will be seen from Figure 2 that strip 21 may be mounted at either end of any unit 20, and that when so mounted access to the slot 18 in that end of the unit 20 is prevented. The slot 18 on the opposite end of such unit is, of course, available for cooperation with a finger 12, and the terminal 22 to which strip 21 is not connected may be connected to load wiring.

With reference to Figure 4, there is shown one of the circuit controlling units 20 having an engagement with the outturned tip 14 and inturned end 13 of a finger 12 of that bracket 9 which is disposed along the left side of the panelboard. Slot 18 receives tip 14 to provide an interlocking engagement about which the unit 20 is rotated in a counterclockwise direction until the spring clip 26 affixed to the unit 20 engages the bus conductor 17 in clamping relation. Below the circuit controlling unit 20 just described can be seen the immediately adjacent circuit controlling unit incorporated in the panelboard. Figure 4 showing its engagement with the bus conductor 16 and the end mounting of that adjacent circuit controlling unit on the bracket 9 which extends along the right side of the panelboard. In Figure 3 there is shown another view of the circuit controlling units 20 making up the panelboard, with adjacent units having engagement alternately with bus conductors 16 and 17, and being alternately interlocked with opposite brackets 9.

It is readily apparent from the description of the exterior construction of the circuit controlling units and their mounting means, and from the illustrations thereof in the drawings, that the individual circuit controlling units incorporated in the panelboard are always mounted in the same direction within the panelboard so that the "on" sides thereof are always aligned, since it is only in this direction that the end slots 18 will receive the longitudinally spaced tips 14. A reversal end for end would present the broad base of slot 18 to the upper edge of the associated finger while the tip 14 remains at its lower edge, thus preventing interlocking engagement of the unit and finger. Since adjacent units are interlocked at opposite ends to the bracket fingers, the conducting strips must be mounted on the other ends and will therefore be polarized so that adjacent circuit controlling units must necessarily be electrically connected to, and mechanically mounted upon, alternate busses. It is also apparent that in order to change a circuit controlling unit from a right-hand interlocked unit to a left-hand interlocked unit it is only necessary to remove the conducting strip 21 from the left side of the unit and place it upon the right side thereof. At the same time, once the conducting strip 21 has been secured upon one end of a unit 20, that unit may be connected only to the selected bus conductor is, therefore, polarized. To restate, a circuit controlling unit once assembled with its conducting strip to cooperate with a particular bus conductor and bracket cannot be engaged with the opposite bracket so as to cooperate with the other bus conductor because of the construction of the slots in the end walls of the circuit controlling units and the aforedescribed positioning of tips 14; that is, if the unit with its conducting strip is turned end for end its end slot will not cooperate and index with the tips 14 at the ends of the fingers on the opposite bracket 9.

From the description and illustration, it will be readily apparent that the invention ensures the distribution of load between the bus conductors of a multi-conductor panelboard, and ensures that movement of the handles of the circuit controlling units in one direction closes the circuits through the units, while movement of the handles in the opposite direction opens the circuits. Furthermore, by requiring the connection of immediately adjacent circuit controlling units to opposite busses, the wiring of these units to loads is facilitated inasmuch as each side of the panelboard will have load wiring to every other circuit controlling unit, instead of to adjacent circuit controlling units.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. A panelboard including an enclosing structure, a plurality of bus conductors therein, a plurality of circuit controlling units, and means including said bus conductors for mounting said units within said panelboard, each unit of said plurality having means for securing said unit to said mounting means, said means for securing comprising an electrically conducting member and a disconnect terminal connector for engaging one of said bus conductors and a formation at the opposite end of said unit for engaging an element of said mounting means, said formation being one of a pair of transversely extending notches located one at each end of said units and each being of similar construction non-uniform at opposite sides of the center of said notches with said non-uniformity being the same at the same sides of said unit so that said units may not be reversed end for end, said member being a strap secured to said unit to enclose one end thereof, said strap being mountable to either end of said unit whereby said strap polarizes said unit in accordance with whichever end of said unit is enclosed by said strap, and means on said mounting means complementarily formed to said notches for cooperation therewith, said notches cooperating with said last mentioned means and said disconnect terminal connector cooperating with a bus conductor to mount said units in said panelboard.

2. A panelboard including an enclosing structure, a plurality of bus conductors therein, a plurality of circuit controlling units, and means including said bus conductors for mounting said units within said panelboard, each unit of said plurality having means for securing said unit to said mounting means, said means for securing comprising an electrically conducting member and a disconnect terminal connector for engaging one of said bus conductors and a formation at the opposite end of said unit for engaging an element of said mounting means, said formation being one of a pair of transversely extending notches located one at each end of said units and each being of similar construction non-uniform at opposite sides of the center of said notches with said non-uniformity being the same at the same sides of said unit so that said units may not be reversed end for end, said member being a strap secured to said unit to enclose one end thereof, said strap being mountable to either end of said unit whereby said strap polarizes said unit in accordance with whichever end of said unit is enclosed by said strap, means on said mounting means complementarily formed to said notches for cooperation therewith, said notches cooperating with said last mentioned means and said disconnect terminal connector cooperating with a bus conductor to mount said units in said panelboard, said straps on adjacent units being secured to opposite ends of said units so that said adjacent units present mounting notches at opposite ends and whereby adjacent units are mounted to different mounting means.

3. The device as claimed in claim 2 in which each of said units has a terminal at each end and means at the bottom wall thereof for releasably engaging said strap, said strap having one end releasably secured to one of said terminals and the other end releasably connected to said means at the bottom wall of said unit, said strap covering one of said notches intermediate its ends and having means for engaging a bus conductor located adjacent to the end of said unit covered by said strap whereby said unit may be mounted in said panelboard by said notch at the uncovered end of said unit and to said bus conductor adjacent to said covered end.

4. A panelboard including an enclosing structure, a pair of parallel bus conductors extending longitudinally therein, a pair of longitudinally extending brackets disposed within said structure at opposite sides of said bus conductors, a plurality of individual mounting means longitudinally spaced along each of said brackets and directed toward the opposite bracket and defining longitudinally spaced mounting areas, one of said mounting means being directed into each of said mounting areas, adjacent areas having mounting means from opposite brackets directed thereinto, a plurality of circuit controlling units mounted between said brackets, one in each of said mounting areas, and means for securing each of said units to one of said mounting means and one of said bus conductors, said securing means comprising a pair of formations on each individual unit and a member fixed to each individual unit, said formations being located one at each end of said unit and each being of similar construction non-uniform at opposite sides of the center thereof and with said non-uniformity being the same at the same side of said unit so that said units may not be reversed end for end, said member being a strap secured to said unit to inclose one end thereof and being mountable to either end of said unit whereby said strap polarizes said unit in accordance with whichever end of said unit is enclosed by said strap, means for engaging a bus conductor fixed to said strap, and means on said mounting means complementarily formed to said formation for cooperation therewith, said formation cooperating with said mounting means and said means for engaging cooperating with a bus conductor to fix said units in said panelboard, said straps on adjacent units being secured to opposite ends of said units so that adjacent units present mounting formations at opposite ends for cooperation in adjacent areas with mounting means from opposite brackets.

5. A panelboard including an enclosing structure, two rows of parallel mechanical mounting means secured to the back wall of said enclosure and projecting forwardly thereof, a plurality of bus conductors disposed between the rows of mechanical mounting means and parallel thereto, a plurality of circuit controlling units and means on each of said units for mechanically and electrically mounting said units within said panelboard, said means for mechanically mounting comprising a formation at each end of said unit, each of said formations being similarly non-uniform at each end of each unit with said non-uniformity being the same at the same sides of said unit so that said units may not be reversed end for end, said electrical mounting means comprising a strap of electrically conducting material and a disconnect terminal connector fixed thereto, said strap being secured to said unit to enclose one end thereof and being mountable at either end of said unit whereby said strap polarizes said unit in accordance with whichever end of said unit is enclosed by said strap, and means on said mechanical mounting means complementarily formed to said formations for cooperation therewith, said formations cooperating with said mechanical mounting means and said disconnect terminal connector cooperating with a bus conductor to mount said units in said panelboard.

6. A panelboard including an enclosing structure, two rows of mechanical mounting means secured to the back wall of said enclosure and projecting forwardly thereof, a plurality of bus conductors disposed between the rows of mechanical mounting means and parallel thereto, a plurality of circuit controlling units and means on each of said units for mechanically and electrically mounting said units within said panelboard, said means for mechanically mounting comprising a formation at each end of said unit, each of said formations being similarly non-uniform at each end of each unit with said non-uniformity being the same at the same sides of said unit so that said units may not be reversed end for end, said electrical mounting means being secured to said unit to enclose one end thereof and being mountable to either end of said unit whereby said means polarizes said unit in accordance with whichever end of said unit is enclosed by said means, and means on said mechanical mounting means complementarily formed to said formations for cooperation therewith, said formations cooperating with said mechanical mounting means and said electrical mounting means cooperating with a bus conductor to mount said units in said panelboard.

References Cited in the file of this patent
UNITED STATES PATENTS

| | | |
|---|---|---|
| 1,938,309 | Williams | Dec. 5, 1933 |
| 2,281,958 | Snavely | May 5, 1942 |
| 2,428,320 | Platz | Sept. 30, 1947 |
| 2,440,824 | Jackson | May 4, 1948 |
| 2,542,853 | Willis | Feb. 20, 1951 |